UNITED STATES PATENT OFFICE.

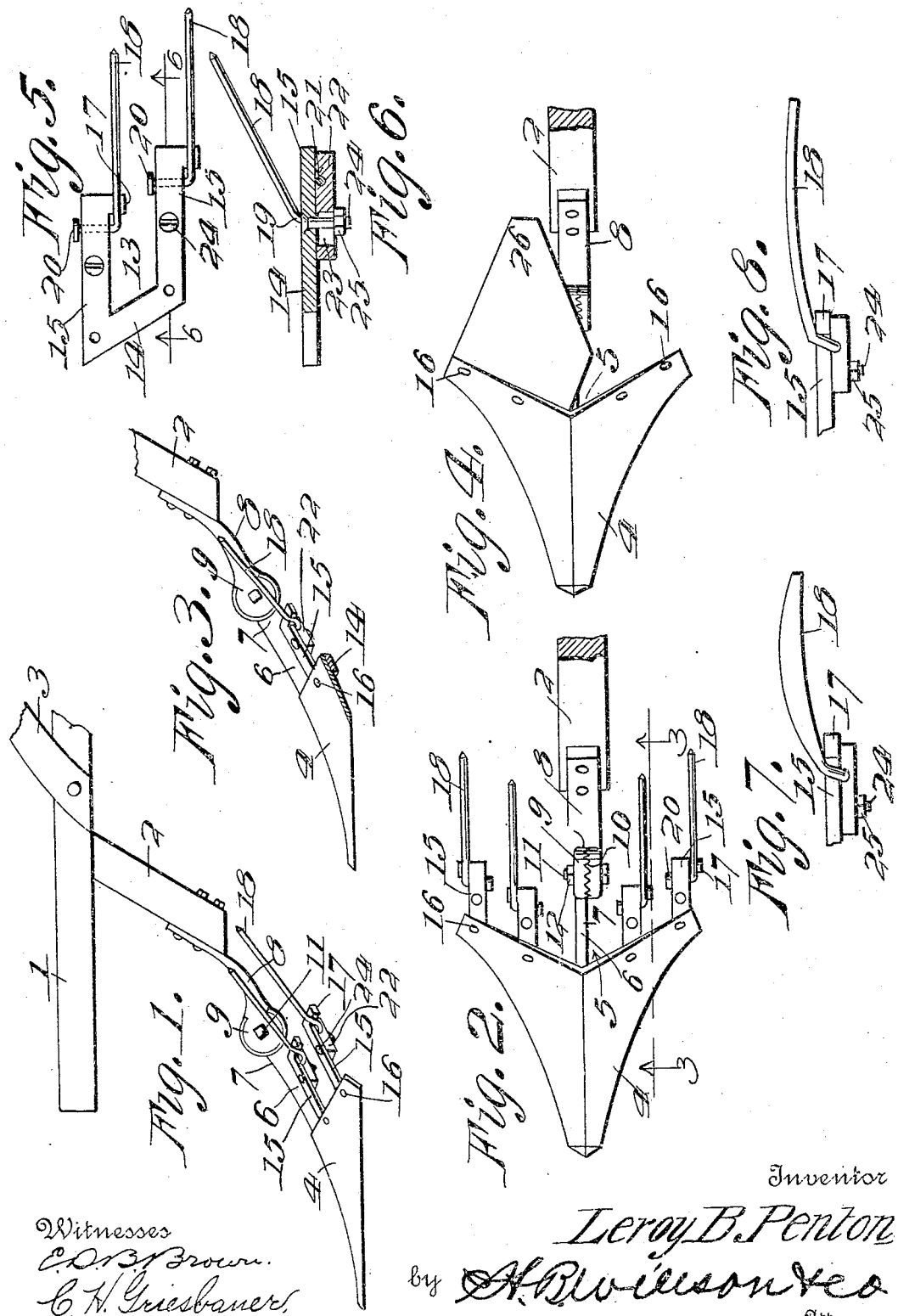

LEROY B. PENTON, OF VILLISCA, IOWA.

SURFACE-CULTIVATING SHOVEL.

948,522. Specification of Letters Patent. Patented Feb. 8, 1910.

Application filed May 13, 1909. Serial No. 495,802.

To all whom it may concern:

Be it known that I, LEROY B. PENTON, a citizen of the United States, residing at Villisca, in the county of Montgomery and State of Iowa, have invented certain new and useful Improvements in Surface-Cultivating Shovels; and I do declare the following to be a full, clear, and exact description of the invention, such as will enable others skilled in the art to which it appertains to make and use the same.

This invention relates to improvements in surface cultivating shovels.

The object of the invention is to provide a cultivating shovel for shallow or surface cultivation, having means whereby the weeds will be separated from the soil and left upon the surface of the ground to be withered or destroyed by the action of the sun, and to provide means whereby the soil will be thoroughly pulverized and a dirt mulch left on the surface, thereby admitting air to and preserving the moisture of the ground.

With the foregoing and other objects in view, the invention consists of certain novel features of construction, combination and arrangement of parts, as will be more fully described and particularly pointed out in the appended claims.

In the accompanying drawings: Figure 1, is a side view of a part of a cultivator, constructed in accordance with my invention. Fig. 2, is a horizontal section through the cultivator standard, showing a top plan view of the shovel and its attachments. Fig. 3, is a vertical sectional view of the same on the line 3—3 of Fig. 2. Fig. 4, is a view similar to Fig. 2, showing the manner of securing a mold board to the cultivator shovel. Fig. 5, is a top plan view of one of the weed separating attachments. Fig. 6, is a longitudinal sectional view of the same on the line 6—6 of Fig. 5. Figs. 7 and 8 are detail views of modified forms of weed separating teeth.

Referring more particularly to the drawings, 1, denotes the plow or cultivating beam to which is secured in any suitable manner a standard 2, and handles 3. To the lower end of the standard 2, is secured my improved shovel 4, and weed separating attachments. The shovel 4, may be of any suitable construction but it is here shown and preferably comprises a blade, the edges of which taper from the rear end to the point of the shovel, and the opposite sides of each are inclined from their outer side edges upwardly to the center of the plate as shown. The rear end of the blade may be straight or provided with a V-shaped notch 5, as shown.

The blade 4, is bolted or otherwise secured to an attaching shank 6, which comprises an outer member 7, and an inner standard engaging member 8. The outer ends of the members 7 and 8 are provided with circular disk shape heads 9, the inner faces of which are provided with radial teeth or notches 10, which engage and interlock when the heads 9, are brought together. The heads 9, are provided with a central aperture or bolt hole, in which is arranged a clamping bolt 11, having a clamping nut 12, by means of which the heads 9, are clamped together in operative position. By means of the notched engaging faces of the heads or disks 9, the outer section 7, of the shank and the shovel secured thereto may be adjusted to any desired angle with respect to the inner section 8, of the shank and the standard 2, of the cultivator.

Bolted or otherwise secured to the underside of the shovel 4, adjacent to its inner edge and on each side of its attaching shank are secured weed separating devices, each of which consists of a supporting frame 13, comprising an attaching blade 14, having a series of rearwardly projecting tooth supporting bars 15. The attaching plates 14, are provided with bolt holes, which are adapted to receive fastening bolts 16, inserted through the shovel adjacent to its rear edge, whereby said tooth supporting plates are rigidily secured to the shovel. On the outer ends of the supporting bars 15, are formed laterally projecting supporting lugs 17, which are adapted to support rearwardly projecting weed separating teeth 18, the inner ends of which are bent downwardly at a suitable angle as shown at 19, and are provided with laterally projecting right angularly formed attaching extensions 20, which are pivotally engaged with bearing notches or recesses 21, formed in the upper side of adjustable fastening plates 22, arranged on the under side of the supporting bars 15, as shown. The plates 22, are provided with a longitudinally disposed slot 23, adapted to receive the lower end of a clamping bolt, which is inserted through a bolt hole in the supporting bars 15, and has screwed on its lower end a clamping nut 25, which is adapted to be screwed up with engagement with the plate 22, to secure the latter in its adjusted position on the under side of the supporting bars 15, after the bearing extension 20 has been engaged with the notch 21, thereby securely fastening the separating tooth 18, to the shovel. When the fastening plates 22, have thus been secured to the supporting bars 15, of the tooth attaching devices, the teeth 18, will be pivotally fastened to said bars and will project rearwardly from the inner end of the shovel 4. The teeth when thus secured will rest upon the supporting lugs 17, by which means they are held at the desired angle, said angle being regulated by shifting the fastening plates 22, forwardly or rearwardly on the bolts 24, thus changing the position of the inner end of the teeth and varying the angle of inclination of the outer portion of the teeth as will be understood.

In connection with the cultivator, I provide a mold board 26, which is adapted to be bolted to the rear edge of the shovel on one side or the other of its attaching shank. When the mold board 26 is applied, the tooth supporting devices on this side of the board are removed and the mold board bolted to the shovel by the bolts 16, which are provided for fastening the teeth attaching devices.

The weed separating teeth 18, may be of any suitable shape, and by pivotally attaching same to the shovel in the manner described they will readily move or swing upwardly when engaged with an obstruction, thus preventing the same from being bent or broken off. By means of the teeth 18, the weeds will be separated from the soil when the latter is lifted and cultivated by the shovel and the weeds left on the surface of the soil where they are soon withered and destroyed by the heat from the sun. By adjustably securing the outer portion of the shovel the same may be adjusted to plow the soil to a greater or less depth as may be desired and by substituting the mold board for the weed separating devices, the soil may be turned to one side or the other.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention.

Having thus described my invention, what I claim is:

1. A surface cultivating shovel, comprising a blade, an attaching shank formed in adjustably connected sections, whereby the angle of the shovel may be changed, a series of weed separating devices secured to the rear edge of the shovel and means to adjust the said devices.

2. A surface cultivating plow or shovel, comprising a blade, means to adjustably connect the blade with the standard of the plow or shovel, a series of weed separating devices, said devices comprising attaching plates adapted to be secured to the blade, a series of rearwardly projecting supporting bars carried by said plates, laterally projecting supporting lugs on the outer ends of said bars, separating teeth pivotally engaged with said plates, and resting on the lugs and means to adjustably secure the plate to said bars, whereby the teeth are supported at the desired angle.

3. A surface cultivating plow or shovel, comprising a beam, a standard secured to said beam, a cultivating blade, an attaching shank formed in separable sections, one of which is secured to said standard, and the other to the blade, heads on the inner end of said sections, said heads having formed therein centrally disposed alined bolt holes and a series of radial notches, whereby said heads are held in adjustable engagement, and a clamping bolt to secure the heads together in their adjusted positions to support the blade at the desired angle.

4. A surface cultivating plow or shovel comprising a standard, a blade secured upon the standard, attaching devices secured to the blade and having offset lugs, and weed separating fingers adjustably secured to the attaching devices and engaging the lugs whereby their vertical position may be altered.

In testimony whereof I have hereunto set my hand in presence of two subscribing witnesses.

LEROY B. PENTON.

Witnesses:
W. B. ARBUCKLE,
S. H. COLEMAN.